July 27, 1965  R. F. HOZAK ETAL  3,197,046
BULK MATERIALS HANDLING PLANT
Filed June 27, 1962  5 Sheets-Sheet 1
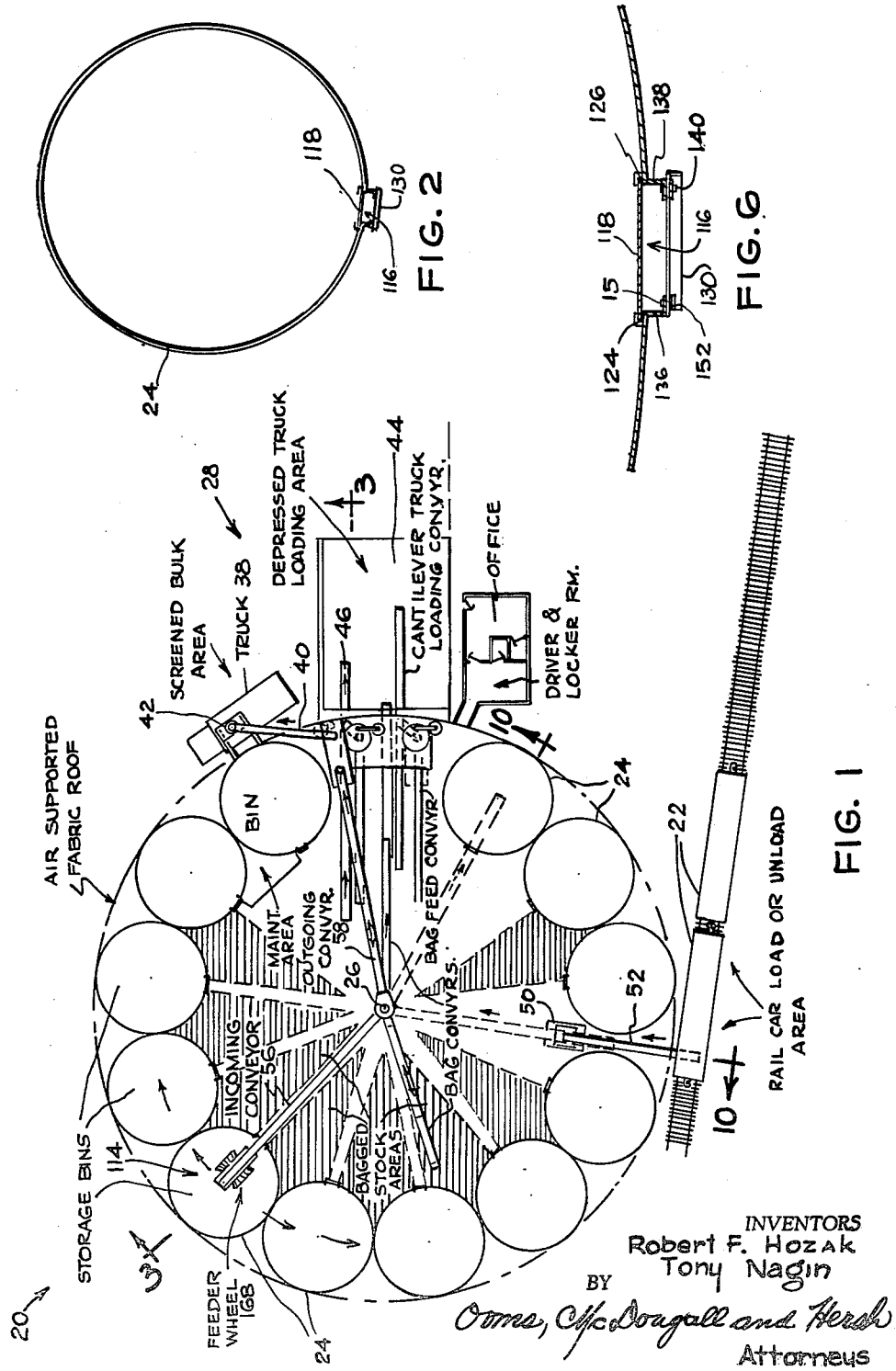
INVENTORS
Robert F. Hozak
Tony Nagin
BY
Ooms, McDougall and Hersh
Attorneys

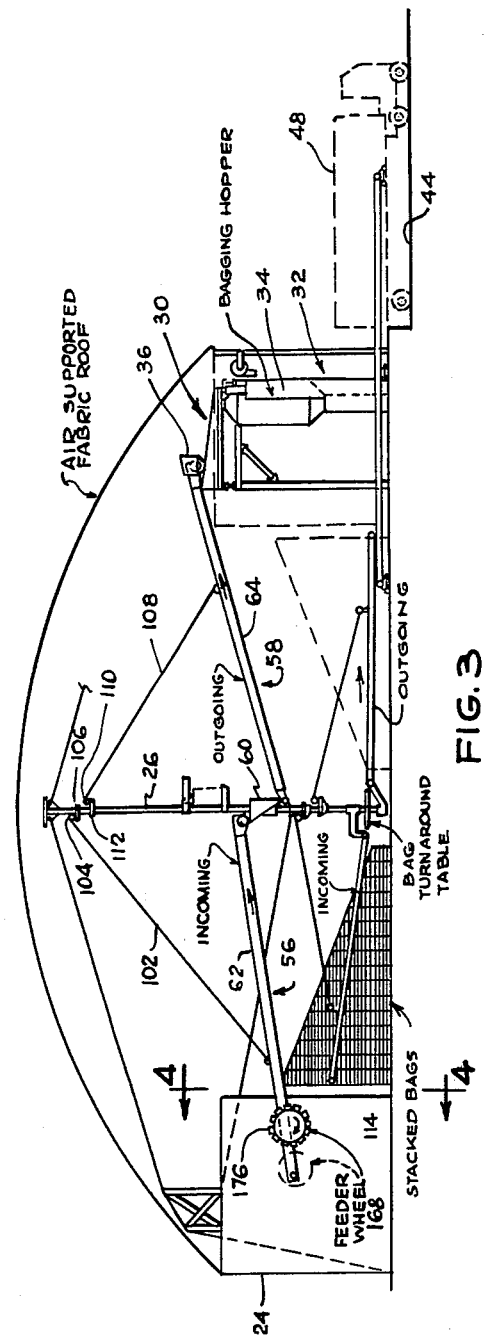

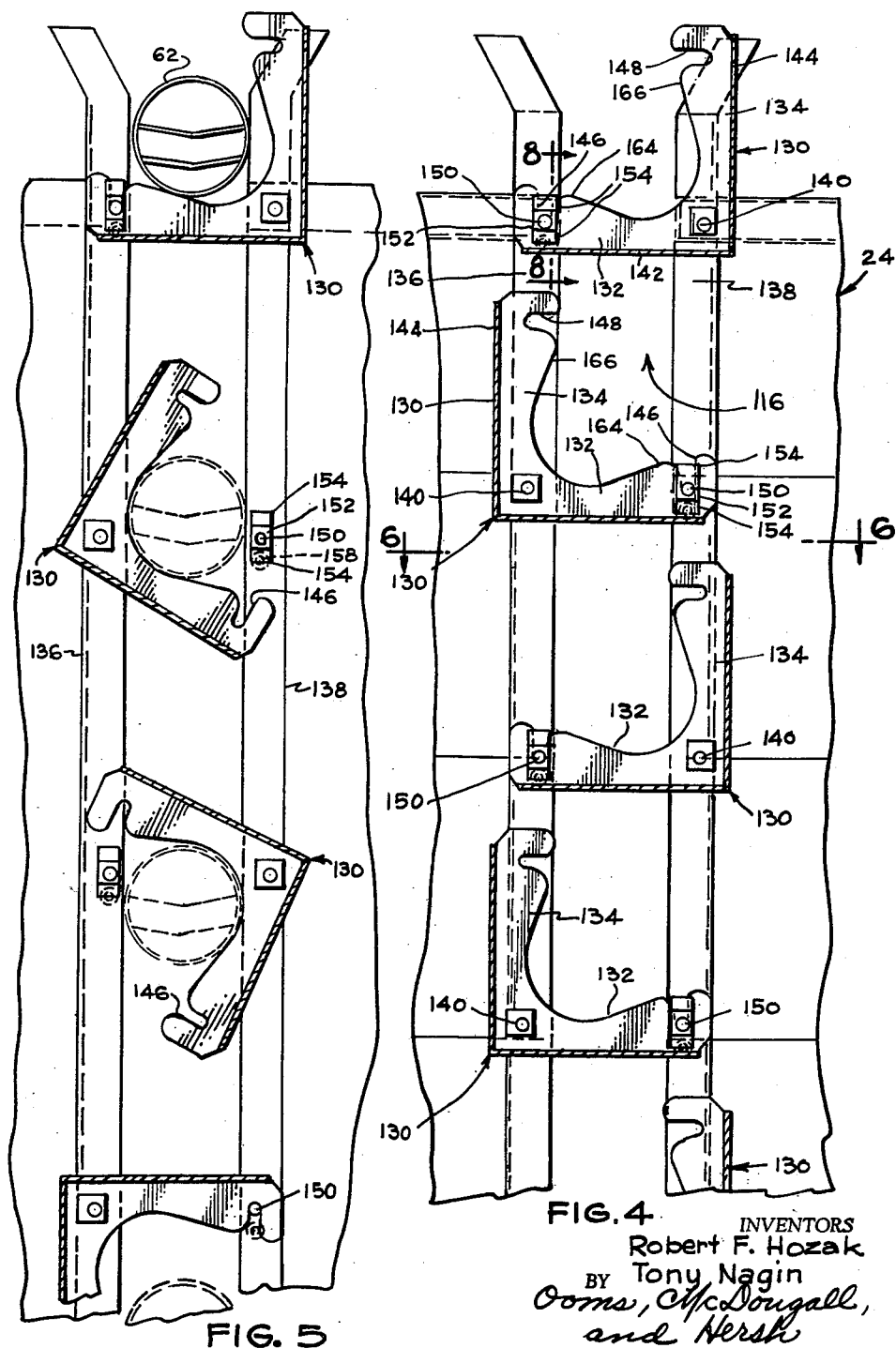

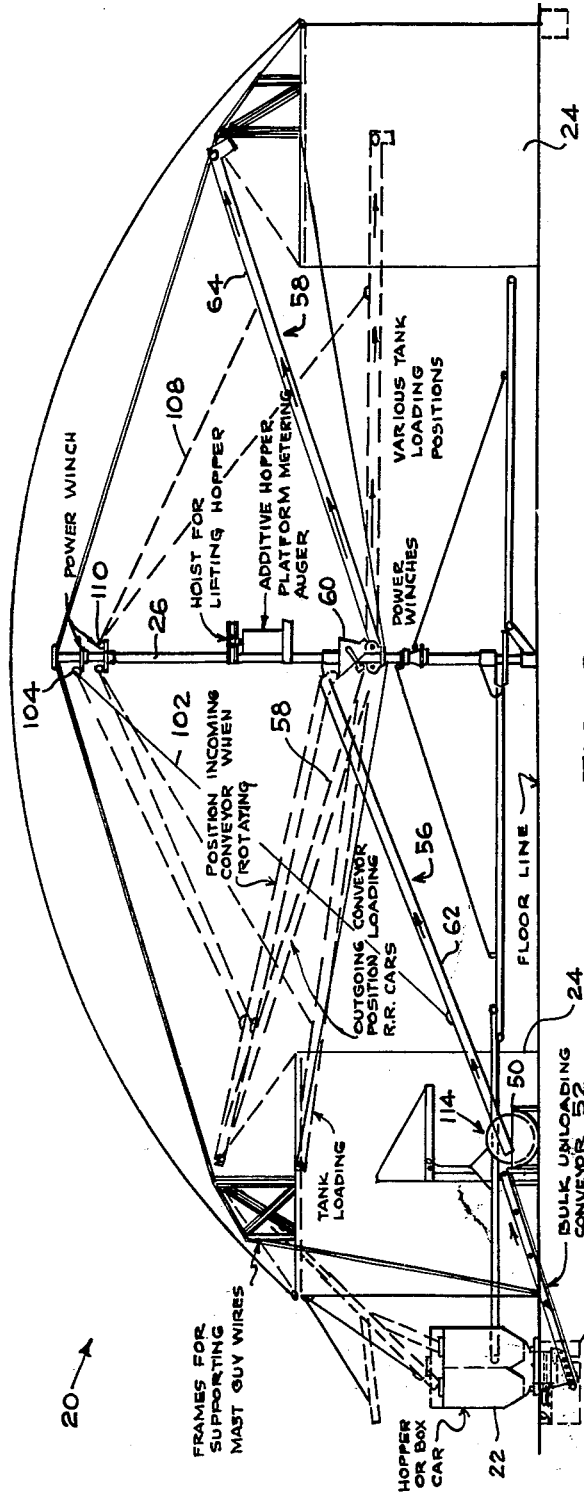
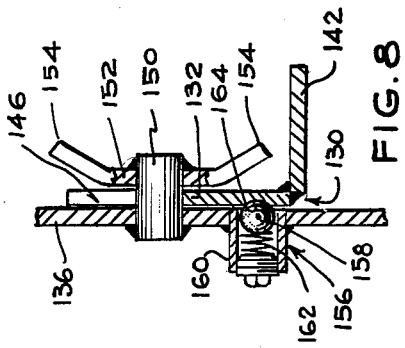
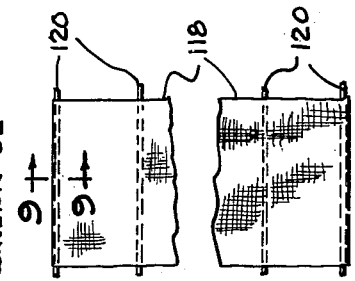

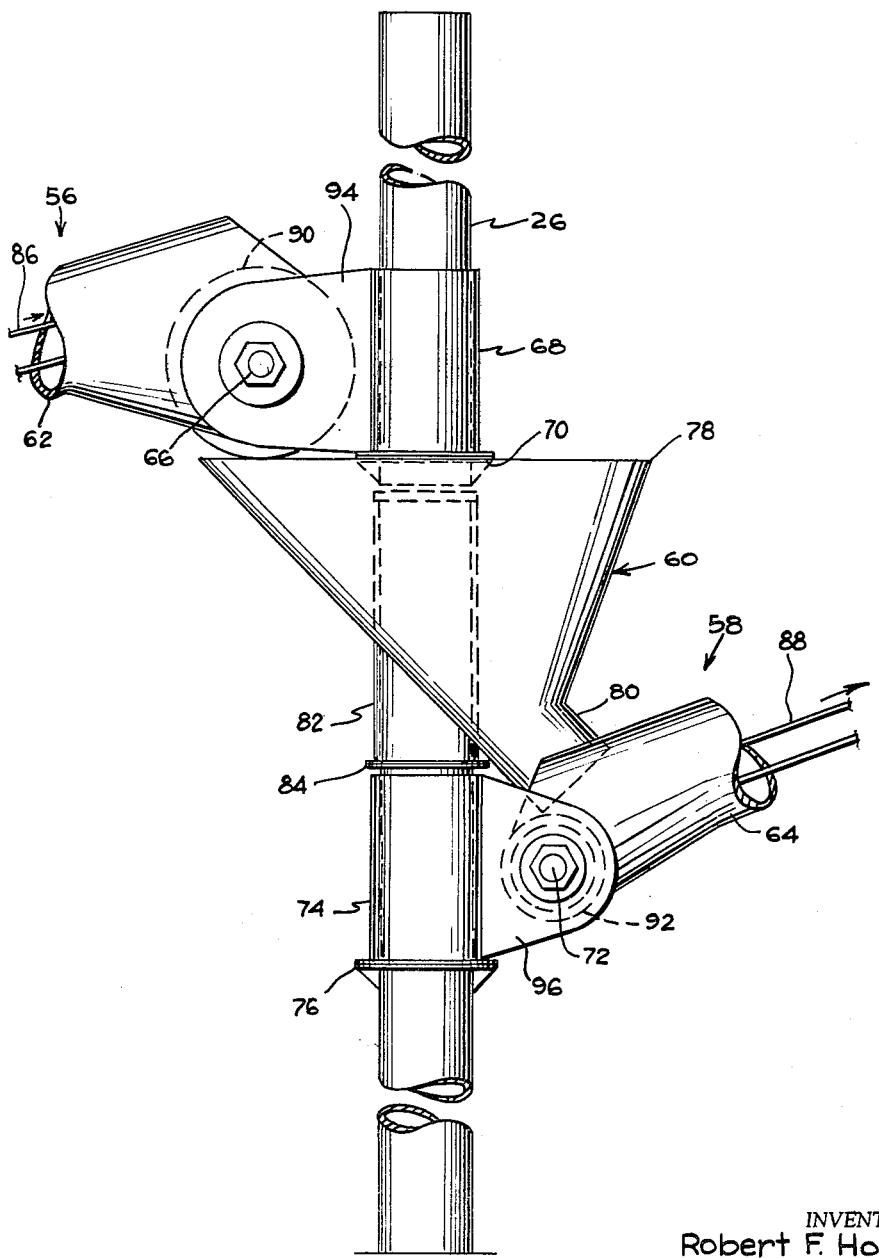

3,197,046
BULK MATERIALS HANDLING PLANT
Robert F. Hozak, Chicago, and Tony Nagin, Riverdale, Ill., assignors to Dial-A-Bin Bulk Handling Corp., Chicago, Ill., a corporation of Illinois
Filed June 27, 1962, Ser. No. 205,761
8 Claims. (Cl. 214—17)

This invention relates to a new and improved bulk materials handling plant which may be employed for handling fertilizer or any other desired granular material, such as various chemicals, crushed rock salt, grain or the like.

One object of the present invention is to provide a new and improved plant which is very economical in construction yet is capable of handling a large volume of bulk materials on an extremely efficient and expeditious basis.

A further object of the invention is to provide a new and improved materials handling plant having a large number of cylindrical bins or tanks for storing the bulk materials, together with conveyors for filling the bins and for removing the materials therefrom, the conveyors being movable downwardly into the bins through a vertical slot therein.

Another object is to provide a new and improved handling plant of the foregoing character in which one of the conveyors is provided with a digger which is adapted to remove material from any of the bins, the conveyor having a boom which supports the digger and is movable downwardly through the vertical slot in the wall of the bin as the material is removed from the bin.

A further object is to provide a new and improved handling plant of the foregoing character in which each of the bins is provided with automatic locking devices for transmitting circumferential tension across the vertical slot in the bin, the locking devices being automatically operable by the conveyor boom as it goes downwardly and upwardly through the slot, so as to provide for the free movement of the conveyor boom while withstanding and maintaining the circumferential tension.

It is a further object of the present invention to provide new and improved locking devices of the foregoing character which take the form of locking levers having arms at right angles to each other for alternately spanning the slot in the bin, the levers being swingable by the conveyor boom as the boom is moved along the slot.

Another object is to provide new and improved locking devices of the foregoing character in which the levers are provided with detent means for maintaining them in their locking positions.

Further objects and advantages of the present invention will appear from the following description, taken with the accompanying drawings, in which:

FIG. 1 is a diagrammatic plan view of a bulk materials handling plant to be described as an illustrative embodiment of the present invention.

FIG. 2 is a plan view on a larger scale, showing one of the storage bins or tanks.

FIG. 3 is a diagrammatic elevational section taken generally along a line 3—3 in FIG. 1.

FIG. 4 is a fragmentary elevational section, taken generally along a line 4—4 in FIG. 3, and showing the entrance slot through which one of the boom conveyors is movable into each of the storage bins, and the automatic locking devices for withstanding the circumferential tension in the bin.

FIG. 5 is a diagrammatic view somewhat similar to FIG. 4 but showing various stages in the operation of the automatic locking devices.

FIG. 6 is a fragmentary horizontal section taken generally along a line 6—6 in FIG. 4.

FIG. 7 is an elevational view showing one of the curtains which may be employed for closing the entrance slots in the bins.

FIG. 8 is a fragmentary enlarged sectional view, taken generally along a line 8—8 in FIG. 4.

FIG. 9 is a fragmentary enlarged sectional view, taken generally along a line 9—9 in FIG. 7.

FIG. 10 is a diagrammatic elevational section taken through the plant, generally along a broken line 10—10 in FIG. 1.

FIG. 11 is a fragmentary enlarged elevational view corresponding to the central portion of FIG. 3 and showing a device for transferring bulk materials between the incoming and outgoing conveyors at the mast.

As already indicated, the drawings illustrate a bulk materials handling plant 20 which may be employed as a distribution center for fertilizer or other granular bulk materials. The plant may be adapted to receive large shipments of bulk materials carried in railroad cars 22, barges or the like. In order to provide a large amount of storage capacity for handling the entire incoming shipment, the plant 22 is provided with a large number of tanks or bins 24 which in this case are cylindrical in shape. The bins 24 are preferably arranged in a substantially circular pattern around a central vertical mast 26.

The material handled by the plant 20 may be shipped out either in bulk or in bags or other suitable containers. Thus, the illustrated plant 20 comprises shipping facilities 28, including a screening machine 30 for segregating the materials according to the size of the granules, and a bagging machine 32 for bagging the screened material. It will be seen that the bagging machine 32 is equipped with a hopper 34 adapted to hold a quantity of the screened material, received from the screening machine 30. The material to be screened may be delivered to a hopper or other receptacle 36 at the top of the screening machine 30.

The screened bulk material may be delivered by the screening machine 30 to the hopper 34 of the bagging machine 32, or may be delivered in bulk to a truck 38 or other vehicle, through a pipe 40 extending between the screening machine 30 and a hopper 42 disposed outside the plant, over the parking area for the truck 38.

To provide for trucks to receive bags of the bulk material, a depressed truck ramp 44 is provided outside the plant, adjacent the bagging machine 32. A conveyor 46 may be provided to carry the bags directly from the bagging machine 32 to a truck 48 which may be backed downwardly onto the ramp. Alternatively, the truck 48 may be loaded with bags which have been stored in the plant 20, as will be developed in greater detail shortly.

It will be noted that the screening machine 30 and the bagging machine 32 are disposed adjacent the circle of the bins 24. In this case, a space is left between two of the bins to accommodate the screening and bagging machines 30 and 32.

The incoming material from the railroad cars 22, barges or the like may be delivered to an incoming receptacle 50 by means of a conveyor 52. In this case, the conveyor 52 is of the belt type and is adapted to extend to the receptacle 50 from a pit 54 into which the railroad cars 22 may be dumped. The cars 22 may be of the hopper bottom type so that the bulk material may be discharged directly into the pit 54. Other types of cars may be employed, in which case the material may be shoveled or otherwise transferred into the pit 54. The conveyor 52 or some other suitable conveyor may be employed to transfer the bulk materials from barges or the like to the receptacle 50. It will be noted that the incoming receptacle 50 is disposed adjacent the circle of the bins 24. A space is left between two of the bins 24 so that the conveyor 52 may pass between the bins.

In order to provide for expeditious and efficient handling of the bulk materials, the plant 20 is provided with an incoming conveyor 56 adapted to carry the bulk materials to the central mast 26, and an outgoing conveyor 58 for carrying the bulk materials away from the mast 26. A device 60 is provided for transferring the bulk materials between the incoming and outgoing conveyors 56 and 58. The incoming conveyor 56 may be employed to carry the bulk material from the incoming receptacle 50 to the mast 26. The bulk material may then be carried by the outgoing conveyor 58 to any of the storage bins 24 or to the receptacle 36 of the screening machine 30. Alternatively, the incoming conveyor 56 may be employed to remove the bulk material from any of the storage bins 24 and to carry the bulk material to the mast 26, where the bulk material is transferred to the outgoing conveyor 58 and is carried to the screening machine 30.

The illustrated incoming and outgoing conveyors 56 comprise booms 62 and 64 which extend radially from the central mast 26. Each boom is swingable about the mast so as to be movable over any of the bins 24 or over any of the other facilities in the plant 20. In addition, each of the booms may be swung in a vertical plane. Thus, the boom 62 of the incoming conveyor 56 is connected at its inner end by means of a horizontal pivot 66 to a sleeve 68 which is received for swiveling movement about the mast 26, as shown to advantage in FIG. 13. The lower end of the swivel sleeve 68 is supported on a flange 70 secured to the mast 26.

Similarly, the inner end of the boom 64 of the outgoing conveyor 58 is connected by means of a horizontal pivot 72 to a swivel sleeve 74 which is rotatably received around the mast 26. The lower end of the sleeve 74 is supported by a flange 76 on the mast. The outgoing conveyor 58 is connected to the mast 26 at a lower point than the incoming conveyor 56.

The transfer device, for carrying bulk materials from the incoming conveyor 56 to the outgoing conveyor 58, takes the form of a hopper which is mounted on the mast 26 between the conveyors. The hopper 60 flares upwardly to a circular upper edge 78 which extends entirely around the mast 26 and is large enough to receive all of the material discharged by the incoming conveyor 56, no matter what the position of the conveyor 56 may be around the mast. At its lower end, the transfer hopper 60 is fitted with a spout 80 which slants downwardly and radially and is connected to the inner end of the outgoing conveyor 64 so that the hopper will act as a funnel to deliver the bulk materials to the conveyor 64. The hopper 60 is rotatably mounted on the mast 26 and is connected to the outgoing conveyor 64 so that it will rotate with the conveyor 64. Thus, the hopper 60 is provided with a swivel sleeve 82 which extends upwardly through the hopper and is rigidly secured thereto. The sleeve 82 is rotatably received around the mast 26 and is supported on a flange 84 secured to the mast. The spout 80 interlocks with the inner end of the conveyor boom 64 and causes the hopper or funnel 60 to rotate with the outgoing conveyor 58.

The illustrated conveyor booms 62 and 64 are in the form of hollow cylindrical tubes adapted to enclose apparatus whereby the bulk material will be carried along the booms. Thus, conveyor belts 86 and 88 may be provided within the incoming and outgoing conveyor booms 62 and 64 to carry the bulk materials. The belts 86 and 88 may be driven by means of electric motors 90 and 92 which may be mounted on brackets 94 and 96 secured to the swivel sleeves 68 and 74. Power may be supplied to the motors 90 and 92 by means of suitable flexible cables. Longitudinal plates 98 and 100 may be mounted within the booms 62 and 64 to support the conveyor belts.

The incoming and outgoing conveyors 56 and 58 may be swung upwardly and downwardly in order to bring the outer ends of the conveyor booms 62 and 64 to the desired elevation. Thus, the incoming conveyor 56 is provided with a hoisting cable 102 which is connected between the boom 62 and a power operated winch 104 mounted on a platform 106 adapted to swivel about the mast 26 near its upper end. By operating the winch 104, the cable 102 may be reeled in or payed out so as to raise and lower the conveyor boom 62. It will be understood that the winch 104 and the platform 106 are rotatable with the conveyor 56, by virtue of the connection afforded by the cable 102.

Similarly, a hoisting cable 108 is connected between the outgoing conveyor boom 64 and a power operated winch 110 which is mounted on a patform 112 adapted to swivel about the mast 26 just below the platform 106.

The incoming conveyor 56 is adapted to remove bulk materials from any of the storage bins 24. For this purpose, a feeder or digger 114 is provided on the outer end of the incoming conveyor boom 62. The feeder 114 and the outer portion of the boom 62 are movable downwardly into each of the bins 24 to a point adjacent the lower end of the bin, so that virtually the entire content of the bin may be removed mechanically, without resorting to manual feeding of the conveyor 56. Various mechanical feeders might be provided that could be moved into each bin 24 through the open top thereof. However, in this case, the conveyor boom 62 is also adapted to be moved into the bin 24, through a vertical slot 116 which is formed in a portion of the wall thereof, at a point facing radially inwardly toward the central mast 26. The conveyor boom 62 is movable downwardly through the slot 116. Various means, such as sectional door panels, may be employed to close the portions of the slot 116 below the boom 62 so as to prevent the bulk material from flowing out of the bin through the slot. In the illustrated construction, as shown to advantage in FIGS. 6–9, the slot 116 may be closed by means of curtains 118 extending across the slot on the inside of the bin 24. Each curtain 118 may be made of canvas or other heavy fabric or sheet material which may be reinforced with a plurality of horizontal metal rods 120. As shown to advantage in FIG. 9, the rods 120 may be retained in pockets 122 sewn into the canvas curtains 118.

The curtains 118 may be retained between vertical guides 124 and 126 mounted on opposite sides of the slot 116, so as to maintain the curtains in alignment with the slot. The weight of the bulk material in the bin 24 prevents the curtains 118 from sliding downwardly below the level of the bulk material. As the bulk material is removed by the conveyor 56, the boom 62 is allowed to move downwardly through the slot 116. The boom pushes the upper portion of each curtain 118 downwardly. As each curtain becomes completely uncovered by the depletion of the bulk material in the bin, the curtain panel may be removed from under the boom. Several of the curtain panels 118 may be employed to cover the entire slot 116 when the bin 24 is full.

As shown to advantage in FIG. 4, automatic locking devices 130 are provided to withstand the circumferential hoop tension in the wall of each bin or tank 24 due to the weight of the bulk material therein. The locking devices 130 transmit the tension across the slot 116 and prevent the bin 24 from spreading at this point. The illustrated locking devices 130 take the form of L-shaped levers, each of which has two latching arms 132 and 134 adapted to extend across the slot 116. The levers 130 are operated automatically by the conveyor boom 62 as it moves downwardly along the slot 116. As shown, the levers 130 are preferably mounted alternately on opposite sides of the slot 116. All of the levers 130 are essentially the same in construction, except that the levers on one side of the slot are right-handed, while the levers on the other side are left-handed.

To reinforce the tank or bin 24 along the slot 116, the locking levers 130 are mounted on rigid angle bars 136 and 138 which may be welded or otherwise secured to the bin 24 on opposite sides of the slot 116. Each of the levers 130 is swingable about a pivot pin 140 mounted on one of the bars 136 and 138. The locking arms 132 and 134 extend at right angles to each other from the axis represented by the pin 140. Reinforcing flanges or ribs 142 and 144 may be provided on the arms 132 and 134.

Adjacent its outer end, the locking arm 132 is formed with a latching slot 146 which opens laterally at right angles to the longitudinal axis of the arm 132. A similar latching slot 148 is formed in the arm 134. The slots 146 and 148 are adapted to interlock with a latching pin 150, mounted on one of the bars 136 and 138, directly across the slot 116 from the pivot pin 140. A guide plate 152 is mounted on the pin 150 and is spaced outwardly from the bar 136 or 138 on which the pin 150 is mounted. The arms 132 and 134 are adapted to slip between the guide plate 152 and the corresponding bar 136 or 138. To facilitate such movement of the arms 132 and 134, the guide plate 152 is formed with a pair of outwardly inclined ears 154 on its upper and lower ends.

Referring to the uppermost locking lever 130 in FIG. 4, it will be seen that the locking arm 132 extends horizontally across the slot 116, while the locking arm 134 extends upwardly from the pivot 140. The slot 146 in the arm 132 is interlocked with the pin 150. A detent mechanism 156 is provided to maintain the lever 130 in this position, despite the tendency of gravity to swing the lever 130 in a counterclockwise direction. As shown, the detent mechanism comprises a movable detent member in the form of a ball 158 which is movably mounted in a sleeve 160 and is biased outwardly by a spring 162. The sleeve 160 is mounted on the bar 136 just below the pin 150. The ball 158 is adapted to be received in a recess or opening 164 formed in the inner face of the arm 132, just below the lower end of the slot 146. When the uppermost lever 130 is moved into the position shown in FIG. 4, the detent ball 158 snaps into the recess 164. A similar detent arrangement is provided for each of the locking levers 130.

FIG. 5 illustrates the action of the locking levers 130 as the conveyor boom 62 moves downwardly through the slot 116. Referring again to the uppermost locking lever 130, the conveyor boom 62 engages the arm 132 and pushes it downwardly so that the lever 130 is swung in a counterclockwise direction. In this way, the slot 146 is disengaged from the pin 150. However, the counterclockwise swinging movement of the lever 130 moves the other locking arm 134 into a horizontal position so that the slot 148 becomes interlocked with the pin 150. It will be seen that a cam 166 is formed on the edge of the arm 132 for engagement by the conveyor boom 62 to insure that the lever 130 will be pushed a sufficient distance by the conveyor boom 62 to insure full locking engagement between the slot 148 and the pin 150. A similar cam 166 is formed on the locking arm 134.

When the conveyor boom 62 is hoisted upwardly through the slot 116, this sequence is reversed. Thus, the boom 62 engages the arm 134 and pushes it upwardly so as to swing the lever 130 in a clockwise direction. In this way, the slot 146 is again brought into locking engagement with the pin 150.

It has already been indicated that a feeder 114 is provided on the outer end of the incoming conveyor boom 62 to remove bulk material from the bins 24 and to feed the bulk material to the incoming conveyor 56. The illustrated feeder 114 comprises a pair of rotary bucket wheels 168 mounted on the outer end of the incoming conveyor boom 62. The bucket wheels 168 are disposed on opposite sides of the boom 62. Each bucket wheel 168 is provided with a plurality of buckets 176 adapted to scoop up the granular material. The bucket wheels 168 are adapted to dump the granular material onto the conveyor 86.

It will be evident that the locking levers 130 of the present invention transfers the circumferential tension in each of the bins across the slot 116. Such tension is due to the weight of the granular material in the bin. Thus, the levers 130 prevent the weight of the granular material from causing the bin to spread at the slot 116. Because of the provision of the locking levers 130, the bin retains its structural integrity very much the same as if the slot 116 were not provided in the bin. Thus, the levers 130 obviate any need for reinforcing the bin or making the bin of heavier material than would otherwise be needed. Accordingly, the arrangement of the locking levers makes it possible to construct each bin at low cost. The automatic operation of the locking levers 130 makes it easy to move the conveyors into and out of the bin.

Various modifications, alternative constructions and equivalents may be employed without departing from the true spirit and scope of the invention, as exemplified in the foregoing description and defined in the following claims.

We claim:
1. In a bulk materials handling plant,
the combination comprising a plurality of substantially cylindrical bins disposed along a circular path,
a conveyor having an elongated boom,
means supporting said conveyor for swinging movement about a vertical axis at the center of said circular path,
said conveyor boom thereby being movable over each of said bins,
means supporting said conveyor boom for swinging movement in a vertical plane,
each of said bins having an open top,
each bin having a substantially cylindrical wall formed with a substantially vertical slot therein facing toward the vertical axis of said conveyor,
said conveyor boom being movable downwardly and upwardly through said slot to afford access for said conveyor to the material in the bin,
movable panel means closing said slot in each bin below the conveyor boom for retaining materials in said bin,
and a plurality of locking devices spaced vertically on each bin and extending across said slot therein for transmitting tension across said slot so as to withstand the weight of the material in the bin,
each locking device comprising an L-shaped lever having first and second arms extending generally at right angles to each other,
means supporting each lever on said bin adjacent said slot for swinging movement through generally 90 degrees to move said arms alternately across said slot,
latching means mounted on each bin across said slot from each lever,
each of said arms having means for disengageably interlocking with said latching means,
said levers being swingable by the downward and upward movement of said conveyor boom along said slot,
and detent means for holding said levers in their locking positions against the action of gravity.
2. In a materials handling plant,
the combination comprising a vertically disposed storage bin having a generally cylindrical wall formed with a generally vertical slot therein,
said bin having an open top,
a conveyor having an elongated boom,
means supporting said boom for swinging movement in a vertical plane downwardly and upwardly along said slot in said bin so as to afford access for said conveyor to the material in said bin,
movable means for closing said slot below said conveyor boom to prevent the escape of material from said bin through said slot,
and a plurality of locking devices mounted at vertically spaced points on said bin along said slot for transmitting circumferential tension across said slot and thereby preventing said bin from spreading at said slot due to the weight of the material in said bin, each of said locking devices comprising a generally L-shaped lever having a pair of arms extending generally at right angles to each other, pivot means mounting said lever for swinging movement on one side of said slot, each of said arms thereby being swingable across said slot, a latching pin mounted on said bin across said slot from each of said pivot means, each of said arms having laterally opening slot means therein for disengageably interlocking with said latching pin, each of said arms having a camming element thereon engageable by said conveyor boom so that said boom will swing each of said levers through generally 90 degrees as said boom is moved along said slot, and detent means for holding said levers in their locking positions against the action of gravity.

3. In a materials handling plant, the combination comprising a vertically disposed storage bin having a generally cylindrical wall formed with a generally vertical slot therein, said bin having an open top, a conveyor having an elongated boom, means supporting said boom for swinging movement in a vertical plane downwardly and upwardly along said slot in said bin so as to afford access for said conveyor to the material in said bin, means for selectively closing said slot below said conveyor boom to prevent the escape of material from said bin through said slot, and a plurality of locking devices mounted at vertically spaced points on said bin along said slot for transmitting circumferential tension across said slot and thereby preventing said bin from spreading at said slot due to the weight of the material in said bin, each of said locking devices comprising a lever having a pair of arms, pivot means mounting said lever for swinging movement on one side of said slot, each of said arms thereby being swingable across said slot, a latching pin mounted on said bin across said slot from each of said pivot means, each of said arms having laterally opening slot means therein for disengageably interlocking with said latching pins, each of said arms having means engageable by said conveyor boom so that said boom will swing each of said levers through generally 90 degrees as said boom is moved along said slot.

4. In a materials handling plant, the combination comprising a vertically disposed storage bin having a generally cylindrical wall formed with a generally vertical slot therein, movable means for closing said slot to prevent the escape of material from said bin through said slot, and a plurality of locking devices mounted at vertically spaced points on said bin along said slot for transmitting circumferential tension across said slot and thereby preventing said bin from spreading at said slot due to the weight of the material in said bin, each of said locking devices comprising a generally L-shaped lever having a pair of arms extending generally at right angles to each other, pivot means mounting said lever for swinging movement on one side of said slot, each of said arms thereby being swingable across said slot, a latching pin mounted on said bin across said slot from each of said pivot means, each of said arms having laterally opening slot means therein for disengageably interlocking with said latching pin, and detent means for holding said levers in their locking positions against the action of gravity.

5. In a materials handling plant, the combination comprising a vertically disposed storage bin having a generally cylindrical wall formed with a generally vertical slot therein, and a plurality of locking devices mounted at vertically spaced points on said bin along said slot for transmitting circumferential tension across said slot and thereby preventing said bin from spreading at said slot due to the weight of the material in said bin, each of said locking devices comprising a generally L-shaped lever having a pair of arms extending generally at right angles to each other, pivot means mounting said lever for swinging movement on one side of said slot, each of said arms thereby being swingable across said slot, a latching pin mounted on said bin across said slot from each of said pivot means, each of said arms having laterally opening slot means therein for disengageably interlocking with said latching pin, and detent means for holding said levers in their locking positions against the action of gravity.

6. In a materials handling plant, the combination comprising a vertically disposed storage bin having a generally cylindrical wall formed with a generally vertical slot therein, a conveyor having an elongated boom, means supporting said boom for swinging movement in a vertical plane downwardly and upwardly along said slot in said bin so as to afford access for said conveyor to the material in said bin, means for selectively closing said slot below said conveyor boom to prevent the escape of material from said bin through said slot, and a plurality of locking devices mounted at vertically spaced points on said bin along said slot for transmitting circumferential tension across said slot and thereby preventing said bin from spreading at said slot due to the weight of the material in said bin, each of said locking devices comprising a lever having a pair of arms, pivot means mounting said lever for swinging movement on one side of said slot, each of said arms thereby being swingable across said slot, a latching pin mounted on said bin across said slot from each of said pivot means, each of said arms having laterally opening slot means therein for disengageably interlocking with said latching pin, each of said arms having means engageable by said conveyor boom so that said boom will swing each of said levers through generally 90 degrees as said boom is moved along said slot.

7. In a materials handling plant, the combination comprising a vertically disposed storage bin having a generally cylindrical wall formed with a generally vertical slot therein, a conveyor having an elongated boom, means supporting said boom for movement in a vertical direction downwarlly and upwardly along said slot in said bin so as to afford access for said conveyor to the material in said bin, means for selectively closing said slot below said conveyor boom to prevent the escape of material from said bin through said slot, and a plurality of locking devices mounted at vertically spaced points on said bin along said slot for transmitting circumferential tension across said slot and thereby preventing said bin from spreading at said slot due to the weight of the material in said bin,
each of said locking devices comprising a lever having a pair of arms,
pivot means mounting said lever for swinging movement on one side of said slot,
each of said arms thereby being swingable across said slot,
a latching pin mounted on said bin across said slot from each of said pivot means,
each of said arms having laterally opening slot means therein for disengageably interlocking with said latching pin,
each of said arms having means engageable by said conveyor boom so that said boom will swing each of said levers through generally 90 degrees as said boom is moved along said slot.

8. In a materials handling plant,
the combination comprising a vertically disposed storage bin having a generally cylindrical wall formed with a generally vertical slot therein,
a conveyor having an elongated boom,
means supporting said boom for movement in a vertical direction downwardly and upwardly along said slot in said bin so as to afford access for said conveyor to the material in said bin,
and a plurality of locking devices mounted at vertically spaced points on said bin along said slot for transmitting circumferential tension across said slot and thereby preventing said bin from spreading at said slot due to the weight of the material in said bin,
each of said locking devices comprising a lever having a pair of arms,
pivot means mounting said lever for swinging movement on one side of said slot,
each of said arms thereby being swingable across said slot,
a latching pin mounted on said bin across slot from each of said pivot means,
each of said arms having laterally opening slot means therein for disengageably interlocking with said latching pin,
each of said arms having means engageably by said conveyor boom so that said boom will swing each of said levers through generally 90 degrees as boom is moved along said slot.

References Cited by the Examiner

UNITED STATES PATENTS 2,298,332 10/42 Applegate.
2,615,594 10/52 Clapp.
2,794,560 6/57 Buschbom.
2,843,273 7/58 Sanden _____ 214—15

HUGO O. SCHULZ, *Primary Examiner.*

GERALD M. FORLENZA, *Examiner.*